Aug. 30, 1938.   J. S. DONALDSON   2,128,804
COUPLING DEVICE
Original Filed Dec. 24, 1936
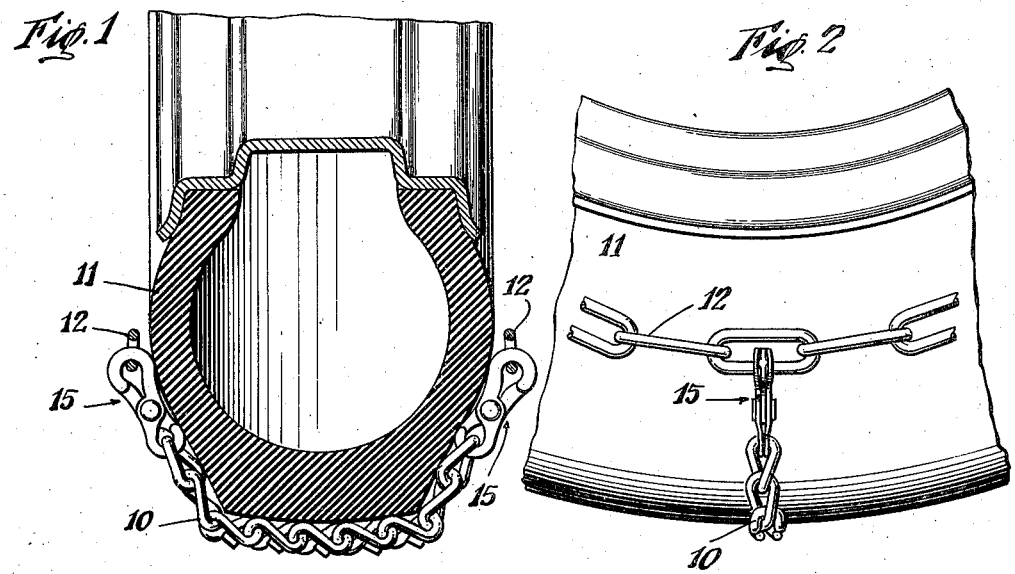
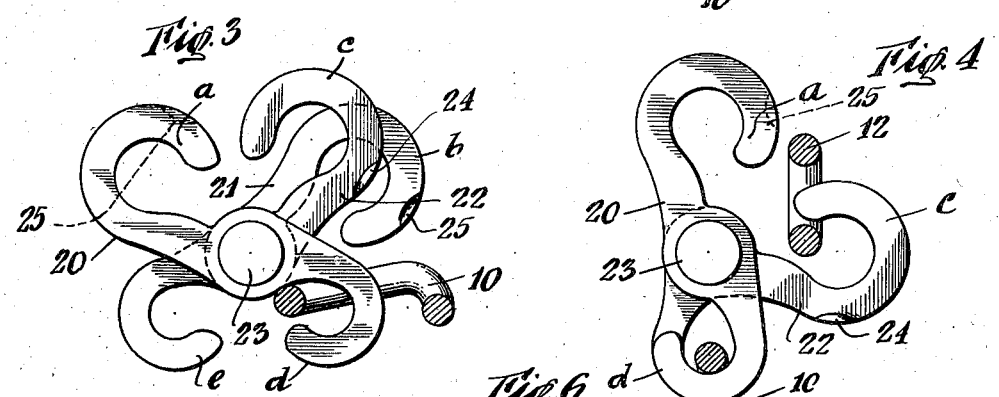
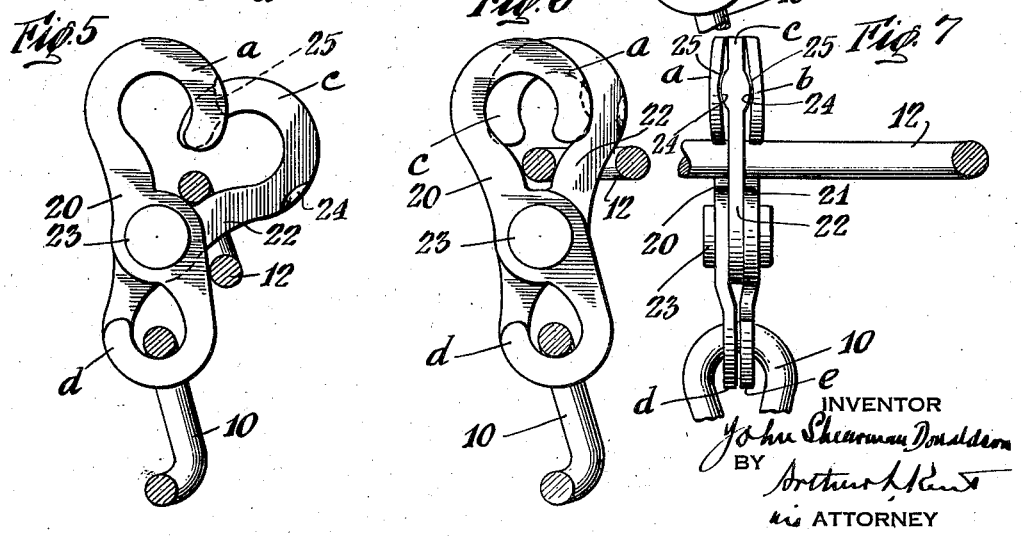
INVENTOR
John Shearman Donaldson
BY
Arthur L. Kent
his ATTORNEY Patented Aug. 30, 1938

2,128,804

UNITED STATES PATENT OFFICE 2,128,804

COUPLING DEVICE

John Shearman Donaldson, St. Albans, N. Y.

Application December 24, 1936, Serial No. 117,508
Renewed January 28, 1938

5 Claims. (Cl. 24—232)

This invention relates to coupling devices intended especially for connecting the cross members of anti-skid tire chains which extend across the tread of the tire to the side chains which extend circumferentially along the sides of the tire. The object of the invention is to provide an improved coupling device especially adapted for such use which shall securely hold the cross-chains coupled to the side chains and shall be readily operable for removing a worn or broken cross-chain and for connecting a new cross-chain to the side chains, and which shall be readily attachable to and detachable from the end of a cross-chain and shall be securely locked to the cross-chain to which it is attached when the cross-chain is connected to the side chains on a tire.

The present invention is an improvement on the coupling device of my copending application, Serial No. 98,660, filed August 31, 1936, which comprises two pivotally connected hooks, one a double, or split, hook and the other a single hook, the two hooks facing in opposite directions toward each other and adapted to be brought into register with each other with the hook portion of the single hook housed between the two hook portions of the split hook, so that when coupled to the side chain the two hooks are locked in closed holding position so long as the link of the side chain extends between the backwardly turned hook ends. In the embodiment of the invention of said application illustrated in the drawing of the application, the coupling is made of wire bent to shape, and the shank portions of the double hook are rigidly connected together by the bend of the wire which forms a loop by which the coupling is attached to the end link of a cross-chain or other article and by a cross-bar welded to the shank portion of the hook and on which the single hook is pivotally mounted.

According to the new invention, the double hook is formed by hook ends of two double hook members the shank portions of which are pivotally connected together and which have at one end like facing hooks forming the double, or split, hook and at the other end hooks facing in opposite directions toward each other, and the single hook member extends between and is pivotally connected to the shank portions of the two double hook members and has a hook end facing in the opposite direction to the double hook and is adapted to be swung into closed position between the double hook members with its hook end in register with the hook ends forming the double hook, so that when coupled to the side chain the double hook and the single hook are locked in closed holding position so long as the link of the side chain extends between the backwardly turned hook ends. The oppositely facing hooks at the other ends of the double hook members serve as means for readily connecting and disconnecting the coupling device from the end link of the cross-chain, the coupling formed by these two hook ends being opened by turning the double hook members relatively to each other to separate these two hooks, and being closed when the double hook members are turned relatively to each other to bring the two like facing hooks at their other ends into alignment and being locked in such closed holding position so long as a link of the side chain extends between said like facing hooks.

The new coupling device may be connected to and disconnected from a side chain without the use of any special tool, and usually without the use of any tool, and can be connected and disconnected so readily that a broken cross-chain may be replaced without removing the side chains from the wheel; and the coupling can also be connected to and disconnected from the end link of a cross-chain easily and quickly and without the use of any tools. The device is strong and of simple and inexpensive construction, the three hook members being most desirably stampings of suitable sheet metal connected by a single rivet. Although especially intended for the use above referred to, that is, for connecting the cross-members of anti-skid tire chains to the side chains, the new coupling device is obviously not limited to such use but is adapted for use wherever it is desired to connect two devices or members with which the hook ends of the device may make engagement.

In the accompanying drawing:

Fig. 1 is a cross-sectional view of a tire fitted with anti-skid chains and showing the cross-chain provided with coupling devices according to the invention;

Fig. 2 is a side view of a part of the tire and chains of Fig. 1;

Fig. 3 is a side view of the coupling device, the device being shown in open position and about to be connected to the end link of a cross-chain;

Fig. 4 is a similar view but showing the two double hook members of the coupling device brought together with their like facing hooks in register with each other, the cross-chain coupling formed by the two oppositely facing hooks at the other end of the double hook members being closed with a cross-chain link extending therethrough, and the coupling means at the other end of the device about to be connected to a side chain link;

Fig. 5 is a similar view with the side chain coupling partly closed;

Fig. 6 is a similar view illustrating the initial movement in opening the side chain coupling; and Fig. 7 is a view looking from the right of Fig. 6.

Referring to the drawing, Figs. 1 and 2 show a cross-chain 10 provided with coupling devices 15 in position on a tire 11, the cross-chain being coupled to the usual side chains 12. Each coupling device 15 as shown in the drawing is formed by three hook members 20, 21 and 22 and a rivet 23 by which said members are pivotally connected, the member 22 being between the members 20 and 21. The two outside members 20 and 21 have at one end hooks a and b which when these members are in line with each other, face in the same direction, forming a double or split hook with a space between the two hooks to receive a hook c on the end of the member 22 which faces in the opposite direction to the double hook. The hooks are U-hooks, that is, they have their hook ends extending backward toward their shank portions so that when the hooks are in closed position in register with each other and a chain link or other article extends through the closed loop or space within the hook ends the hooks are thereby locked together and cannot open to release the link or other article so long as it lies between the turned-back ends of the hooks.

The double hook members 20 and 21 have at their other end hooks d and e facing in opposite directions toward each other which are also U-hooks and which when the hooks a and b are in register with each other form a closed loop. These hooks d and e of the double hook members thus form a coupling by which the coupling device may be connected to the end link of a cross-chain or other article and which is locked in closed holding position so long as the like facing hooks a and b of the double hook members are held in alignment with each other. The single hook member 22 does not extend between the hooks d and e, and these hook ends d and e of the double hook member are most desirably bent inward toward each other so that they come close together.

The hook members 20, 21 and 22 are most desirably made of stampings of suitable sheet metal and are most desirably pivotally connected by a single pivot as shown. It is not necessary, however, that the single hook member be pivotally mounted on the pivot which connects the two double hook members, although this arrangement is more desirable than a construction in which the single hook member is otherwise pivotally mounted.

In using the coupling device for connecting a cross-chain to a side chain, it is first connected to the end link of the cross-chain by swinging the two double hook members 20 and 21 to open the coupling, then entering the end of the cross-chain link between the end hooks d and e as shown in Fig. 3, and then swinging the members 20 and 21 into alignment to bring their like facing hooks a and b into register with each other and to close the coupling at the other end formed by the hooks d and e as shown by Fig. 4. Then to connect the coupling device so attached to the cross-chain to the side chain, the chain link to which the coupling device is to be attached is slipped over the end of the single hook c, as shown in Fig. 4, and turned and slid around the hook portion and back over the shank portion of the single hook to a position as shown in Fig. 5 so that the single hook may then be swung to its closed position between the hook portions of the double hook. When the single hook has been thus moved to its closed position, the chain link is moved out to the space between the hook ends of the two hooks as shown in Fig. 1. Then, so long as the chain link extends through the coupling formed by the double hook and the single hook c, the hooks will thereby be locked together and the coupling cannot become uncoupled from the chain to which it has been attached. To detach the coupling from the side chain the above operations are reversed, that is, the link to which the coupling is attached is moved inward past the hook ends, as shown in Fig. 6, and the single hook is then turned outward away from the double hook and the chain link is moved around the single hook and off from the end thereof. The device may then be disconnected from the cross-chain by moving the end of the cross-chain link inward past the ends of the hooks d and e and then swinging the members 20 and 21 to open the coupling formed by hooks d and e.

The device is most desirably made so that when the hook end of the single hook member has been moved all the way into registering position with the double hook it will be held in this position independently of the chain link or other article extending through the coupling. For this purpose, as shown, the hook ends of the double hook are made to have a slight flare outward toward the front of the hook and are spaced so that the distance between the front or entrance parts thereof is slightly greater and the distance between the rear parts slightly less than the width of the hook end of the single hook, so that when the two hooks have been moved into register the single hook will be wedged between the two hook portions of the double hook, as shown in Fig. 7, and will thereby be frictionally held in such position.

In order to aid in opening the coupling formed by the double hooks a, b, and the single hook c when its two hooks are so frictionally held in closed position, the hooks are most desirably shaped so that by moving the chain link to which they are connected inward from the hook ends the two hooks may be forced apart sufficiently to break the friction grip of the double hook on the single hook. For this purpose, as shown, the shank portions of the two hooks are so shaped that they are inclined toward each other in the direction of their pivotal connection with the distance between them somewhat less than the thickness of the chain link. By pushing the link inward, the two hooks may be forced apart, as indicated by Fig. 6, sufficiently to break the friction grip by which they are normally held closed together, and, the friction grip having been thus broken, the hooks may then readily be swung to open position by the fingers.

The extreme tip ends of the hooks a, b and c are most desirably shaped to extend inwardly sufficiently so that when the hooks are in register in closed position the space between the tip ends will be only just sufficient to permit the chain link to which the coupling is attached to pass. This ensures full closing of the coupling in attaching it to a chain link, since, if the coupling has not been fully closed when the chain link is moved out to its position between the hook ends, then by engagement of the link with the inwardly extending hook ends the hooks will be forced to their fully closed relative positions, in which they will then be held by the grip of the double hook on the single hook. By this formation of these hooks, also, the possibility of accidental opening of this coupling is reduced, since the chain link will be hindered from moving inward to act against the inclined cam faces of the shank portions of the hooks.

To afford a finger or tool hold to assist in the opening movement of the single hook for disconnecting the coupling device from the side chain, the edge of the single hook is desirably formed with lips 24 which are received in recesses 25 in the edges of the double hook.

What is claimed is:

1. A coupling device, comprising two hook members pivotally connected intermediate their ends and having like facing U-hooks at one end forming a double hook and oppositely facing U-hooks at the other end which when the hooks forming the double hook are in register with each other form a closed loop, and a third hook member pivotally connected to the first said members and having a U-hook to swing between the hooks of said double hook, the single hook of said third member and said doube hook facing in opposite directions toward each other.

2. A coupling device, comprising two hook members pivotally connected intermediate their ends and having like facing U-hooks at one end forming a double hook and oppositely facing U-hooks at the other end which when the hooks forming the double hook are in register with each other form a closed loop, and a third hook member having a U-hook at an end thereof mounted between the first said members and pivotally connected thereto to swing between the hooks of said double hook, the single hook of said third member and said double hook facing in opposite directions toward each other.

3. A coupling device, comprising two hook members pivotally connected intermediate their ends and having like facing U-hooks at one end forming a double hook and oppositely facing U-hooks at the other end which when the hooks forming the double hook are in register with each other form a closed loop, and a third hook member having a U-hook at an end thereof mounted between the first said members and pivoted on the pivot means connecting the first said members to swing between the hooks of said double hook, the single hook of said third member and said double hook facing in opposite directions toward each other.

4. A coupling device, comprising two members pivotally connected intermediate their ends and a third member shorter than the first said members pivotally mounted between the first said members on the pivot means connecting the first said members, said members being shaped to form two couplings, one at each end of the device, one coupling being formed by a single U-hook at the end of the third member and spaced like-facing U-hooks at one end of the first said members constituting a double hook, and said double hook and said single hook facing in opposite directions toward each other, and the other coupling being formed by oppositely facing U-hooks at the other end of the first said members.

5. A coupling formed of two pivotally connected U-hooks facing in opposite directions, one of the hooks being a single hook and the other being a double hook the hook portions of which are spaced to permit the hook portion of the single hook to enter between them, in which the double hook is formed of two members pivotally connected and having portions extending beyond the point of such pivotal connection and provided with oppositely facing hooks forming a closed loop when the first-mentioned hook portions of said members are in register with each other.

JOHN SHEARMAN DONALDSON.